United States Patent
Saito et al.

(10) Patent No.: US 11,218,262 B2
(45) Date of Patent: Jan. 4, 2022

(54) USER TERMINAL AND WIRELESS COMMUNICATION METHOD

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 32 days.

(21) Appl. No.: 16/622,558

(22) PCT Filed: Jun. 15, 2017

(86) PCT No.: PCT/JP2017/022226
§ 371 (c)(1),
(2) Date: Dec. 13, 2019

(87) PCT Pub. No.: WO2018/229956
PCT Pub. Date: Dec. 20, 2018

(65) Prior Publication Data
US 2021/0152301 A1 May 20, 2021

(51) Int. Cl.
*H04L 25/02* (2006.01)
*H04W 72/04* (2009.01)
*H04L 5/00* (2006.01)

(52) U.S. Cl.
CPC ........ *H04L 5/0048* (2013.01); *H04L 25/0228* (2013.01); *H04W 72/0406* (2013.01)

(58) Field of Classification Search
None
See application file for complete search history.

(56) References Cited

U.S. PATENT DOCUMENTS

2012/0318730 A1  12/2012 Tamai et al.
2013/0301491 A1* 11/2013 Bashar ............... H04L 5/0035
370/280

(Continued)

FOREIGN PATENT DOCUMENTS

EP           2543429 A1    1/2013
JP           S53-44486 A   4/1978
(Continued)

OTHER PUBLICATIONS

M. Shimamura et al., "Wet spinning of acrylonitrile-p-sodium styrenesulfonate copolymer", Journal of the Chemical Society of Japan, Industrial chemistry Section, vol. 71, No. 8, 1968, edited and published by the Chemical Society of Japan, with English partial translation (7 pages).

(Continued)

*Primary Examiner* — Duc T Duong
(74) *Attorney, Agent, or Firm* — Osha Bergman Watanabe & Burton LLP

(57) ABSTRACT

Provided is a user terminal to be used in a future wireless communication system which bundles a plurality of slots (sub-frames) in a time direction. When applying bundling, a Front-loaded DMRS (Demodulation Reference Signal) is mapped to the rear of a control channel in a leading slot, and in second and subsequent slots, mapping is carried out on the basis of a rule to prevent conflict between the Front-loaded DMRS and the control channel. A control unit (203) of a user terminal (20) stipulates, in second and subsequent slots, the mapping configuration of the Front-loaded DMRS (the existence of mapping and/or the mapping position) on the basis of the aforementioned rules.

4 Claims, 15 Drawing Sheets

(56) References Cited

U.S. PATENT DOCUMENTS

| | | | |
|---|---|---|---|
| 2014/0219199 A1* | 8/2014 | Ji | H04W 88/08 370/329 |
| 2014/0254504 A1* | 9/2014 | Bashar | H04L 5/0048 370/329 |
| 2014/0254516 A1* | 9/2014 | Lee | H04L 5/0016 370/329 |
| 2014/0301353 A1* | 10/2014 | Frenne | H04L 5/0048 370/330 |
| 2016/0044615 A1* | 2/2016 | Bashar | H04W 72/0413 370/280 |
| 2016/0192385 A1* | 6/2016 | Tooher | H04L 27/2611 370/336 |
| 2016/0270059 A1* | 9/2016 | Chen | H04L 5/0051 |
| 2016/0338046 A1* | 11/2016 | Chen | H04L 5/0048 |
| 2017/0215201 A1* | 7/2017 | Kim | H04L 1/1812 |
| 2018/0205507 A1* | 7/2018 | John Wilson | H04L 5/0051 |
| 2018/0332619 A1* | 11/2018 | Manolakos | H04W 72/082 |
| 2019/0045556 A1* | 2/2019 | Bagheri | H04W 74/0858 |
| 2019/0140793 A1* | 5/2019 | Takeda | H04L 5/0007 |
| 2019/0199487 A1* | 6/2019 | Ko | H04B 7/0417 |
| 2020/0052740 A1* | 2/2020 | Zhang | H04L 5/0048 |
| 2021/0105110 A1* | 4/2021 | Kim | H04L 5/0048 |
| 2021/0105114 A1* | 4/2021 | Yum | H04L 5/0048 |

FOREIGN PATENT DOCUMENTS

| | | |
|---|---|---|
| JP | S61-90708 A | 5/1986 |
| JP | 2000-24475 A | 1/2000 |
| JP | 2007283287 A | 11/2007 |
| WO | 2011/108580 A1 | 9/2011 |

OTHER PUBLICATIONS

International Search Report issued in International Application No. PCT/JP2018/020565, dated Sep. 4, 2018 (2 pages).

Written Opinion issued in International Application No. PCT/JP2018/020565, dated Sep. 4, 2018 (4 pages).

3GPP TS 36.300 V13.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Jun. 2016 (310 pages).

R1-165575, Qualcomm, Ericsson, Panasonic, NTT Docomo, ZTE, Convida, Nokia, ASB, Sony, Intel, 3GPP TSG RAN WG1 #85, "Way Forward on Frame Structure," May 2016 (2 pages).

R1-1707439, CATT, "Discussion on DMRS design for DL sTTI," 3GPP TSG RAN WG1 Meeting #89, May 2017 (9 pages).

R1-1708596, Qualcomm Incorporated, "Discussion on DL DMRS design," 3GPP TSG RAN WG1 Meeting #89, May 2017 (13 pages).

R1-1708123, Huawei, HiSilicon, "Discussion on data transmission duration," 3GPP TSG RAN WG1 Meeting #89, May 2017 (7 pages).

International Search Report issued in corresponding International Application No. PCT/JP2017/022226; dated Aug. 15, 2017 (5 pages).

Written Opinion of the International Searching Authority issued in corresponding International Application No. PCT/JP2017/022226; dated Aug. 15, 2017 (4 pages).

Office Action issued in the counterpart Japanese Patent Application No. 2019-524679, dated May 11, 2021 (5 pages).

* cited by examiner

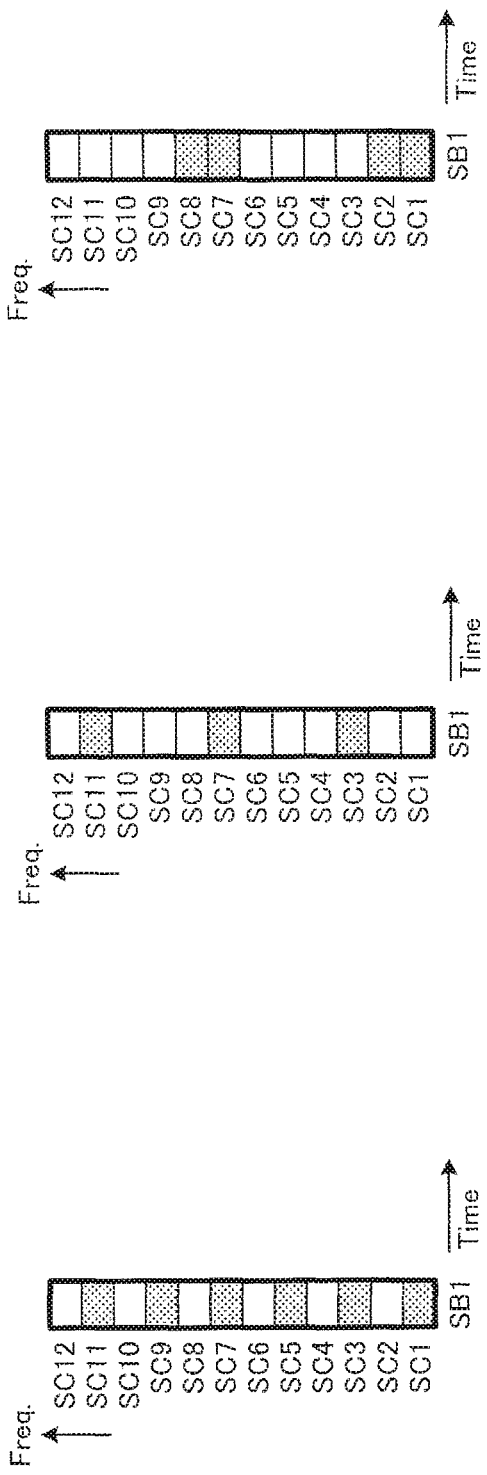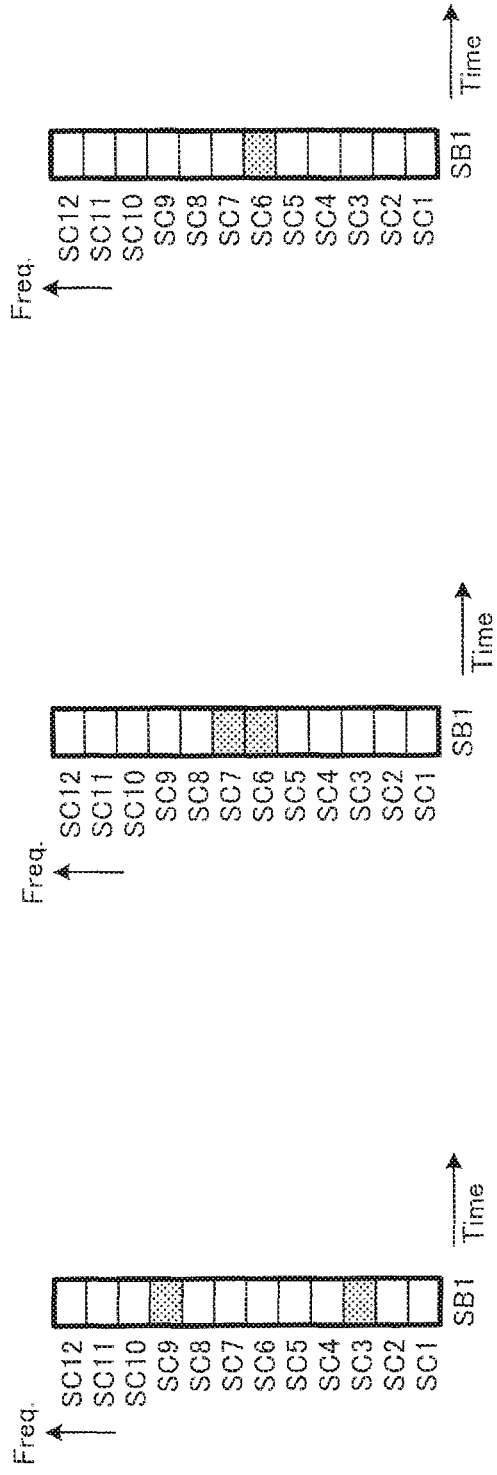

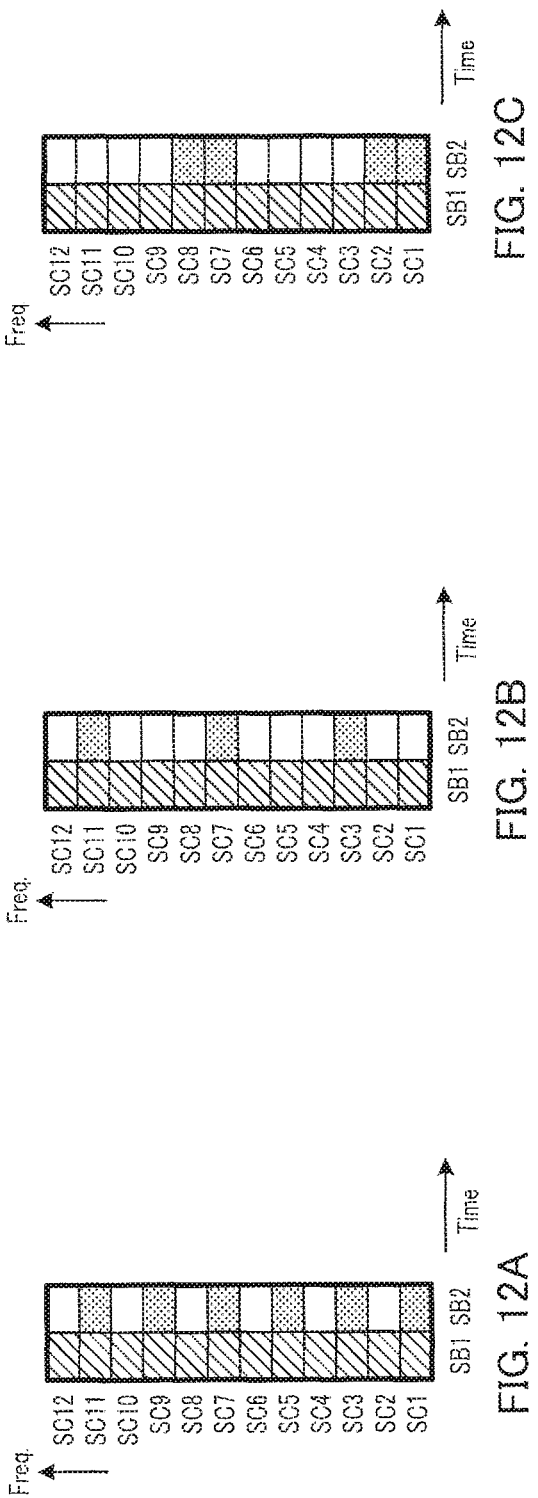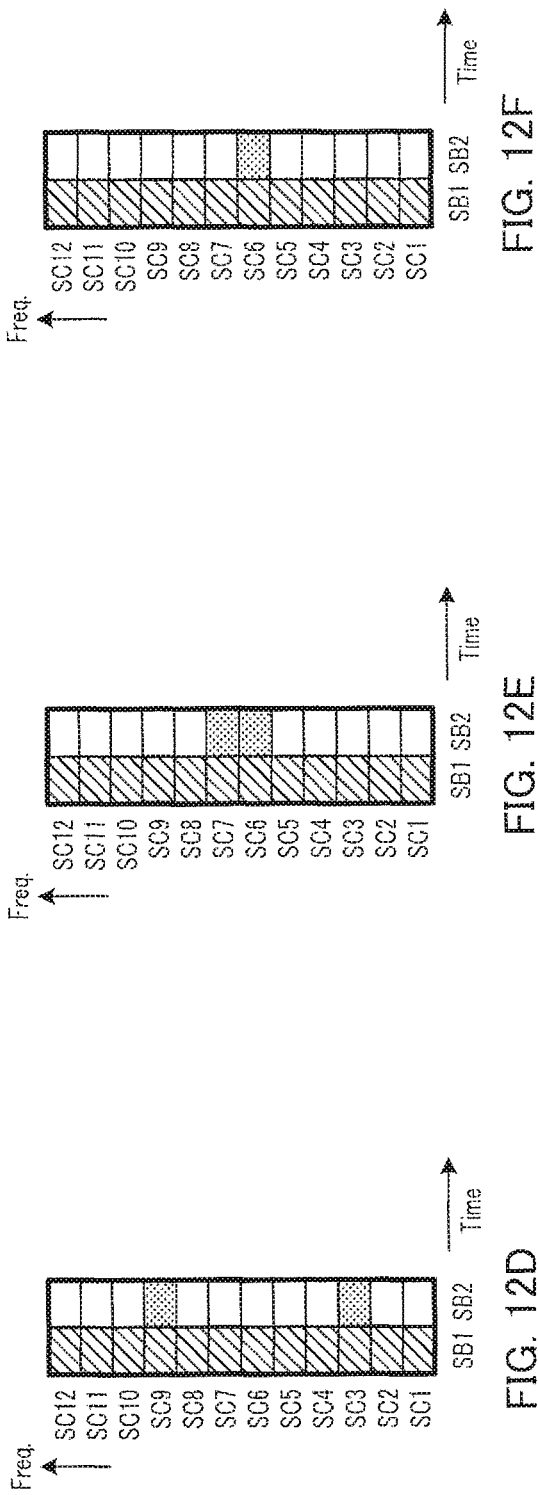

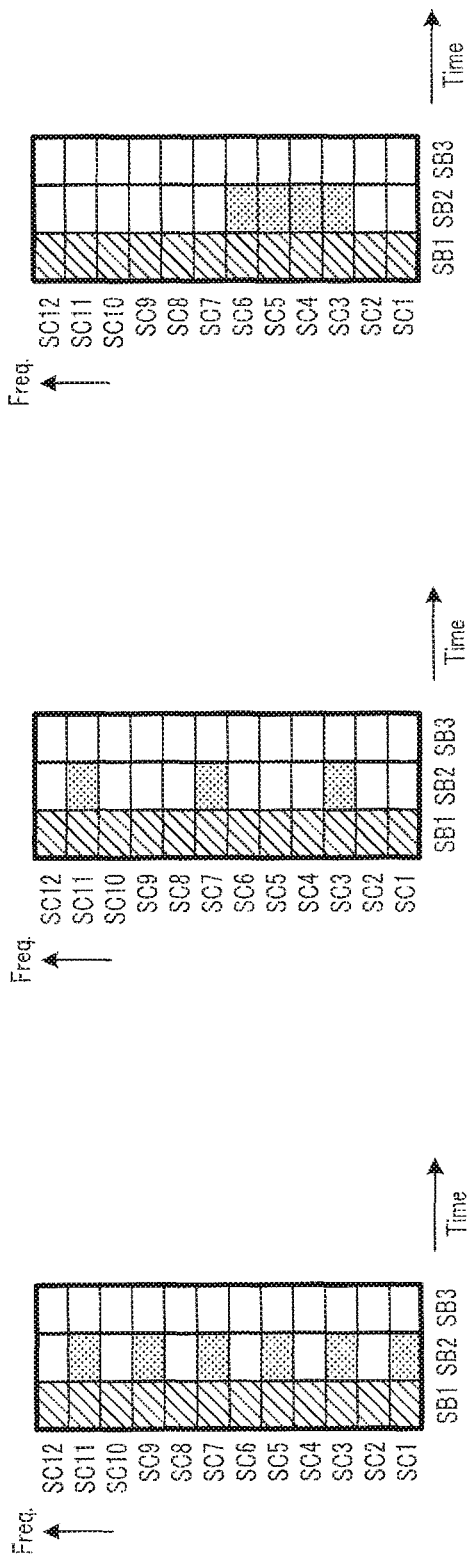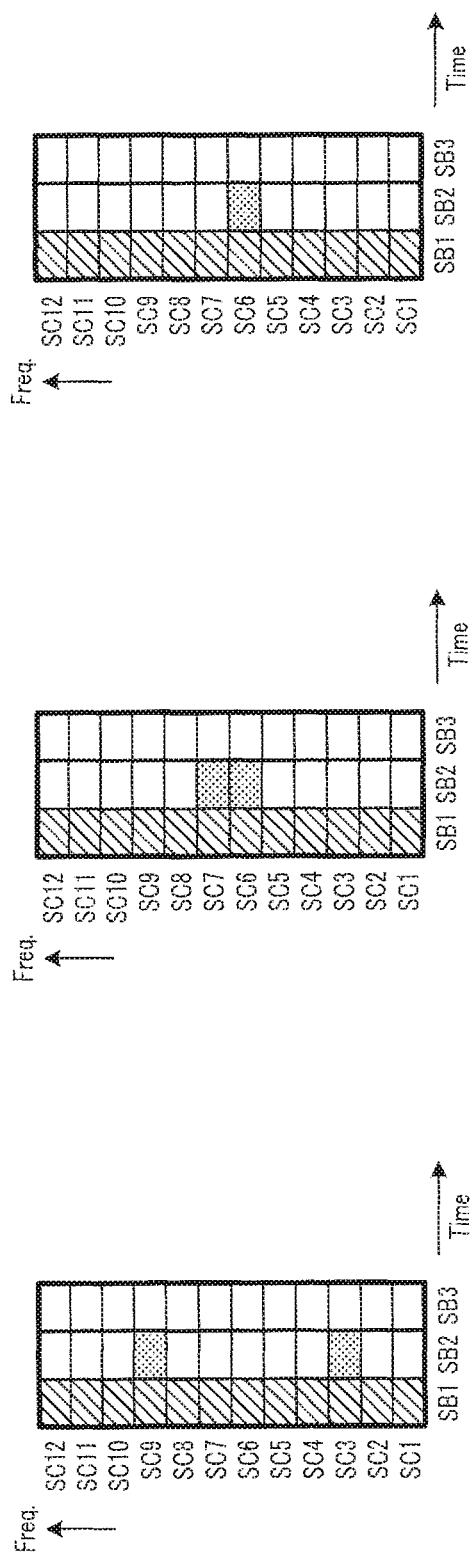
FIG. 13A  FIG. 13B  FIG. 13C
FIG. 13D  FIG. 13E  FIG. 13F

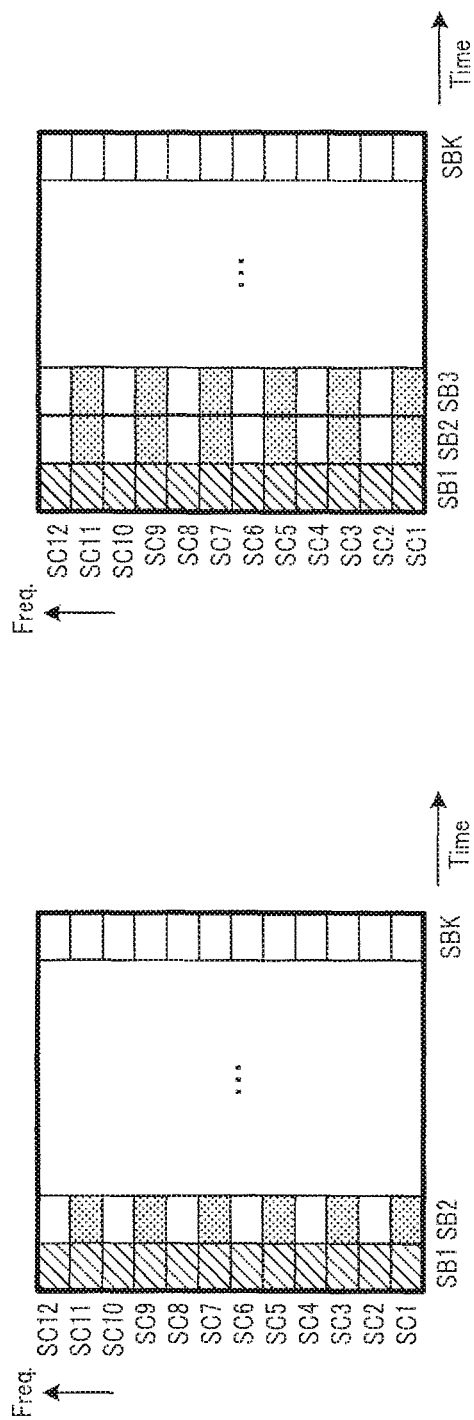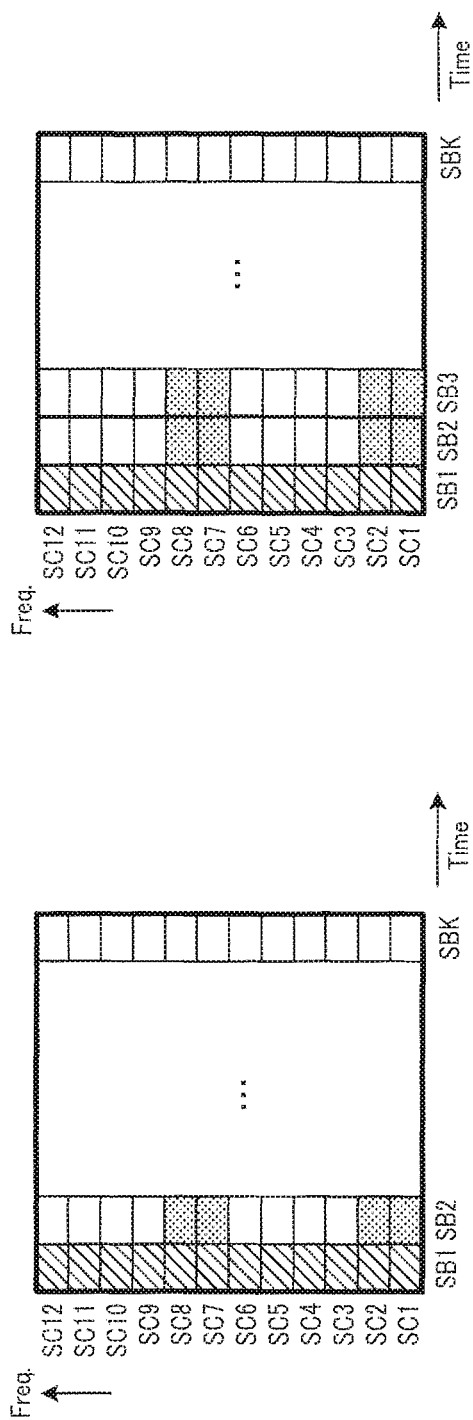

USER TERMINAL AND WIRELESS COMMUNICATION METHOD

TECHNICAL FIELD

The present invention relates to a user terminal and a radio communication method in a next-generation mobile communication system.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE (for example, the systems called LTE-Advanced (LTE-A), Future Radio Access (FRA), 5th generation mobile communication system (5G), 5G plus (5G+), New Radio Access Technology (New-RAT), and the like) have also been studied for achieving a broader bandwidth and a higher speed based on LTE.

Mapping a demodulation reference signal (for example, a Demodulation Reference Signal (DMRS)) in front of a subframe (Front-loaded DMRS) has been studied for the future radio communication system in order to achieve reduction in a processing time required for channel estimation and signal demodulation in a subframe (NPL 2). The Front-loaded DMRS is mapped to a symbol the same as or rearward (for example, immediately after) a control channel.

Additionally, bundling a plurality of slots (subframe) in a time direction (time direction Bundling) has been studied for the further radio communication system. The channel estimation performed collectively on a plurality of slots bundled in the time direction can give effectives such as channel estimation accuracy improvement and Doppler resistance improvement.

The Front-loaded DMRS has been mapped to a fixed symbol in each slot in a normal slot configuration of 7 symbols or 14 symbols independently from a position of the control channel until now.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016
NPL 2
R1-165575, Qualcomm, Ericsson, Panasonic, NTT Docomo, ZTE, Convida, Nokia, ASB, Sony, Intel, "Way Forward On Frame Structure," May 2016

SUMMARY OF INVENTION

Technical Problem

A size of the control channel in each slot (the number of symbols) is not constant. For this reason, if a Front-loaded DMRS is mapped to a symbol immediately after a control channel in a first slot in the time direction Bundling, for example, the Front-loaded DMRS may collide with the control channel in a second or subsequent slot.

One of objects of an aspect of the present invention is to provide a user terminal and a radio communication method capable of preventing a collision between the Front-loaded DMRS and the control channel when the time direction Bundling is applied.

Solution to Problem

A user terminal according to one aspect of the present invention includes: a reception section that receives a downlink signal including a control channel and a Front-loaded Demodulation Reference Signal (DMRS) with a plurality of slots being bundled; a control section that demaps the control channel and the Front-loaded DMRS from the downlink signal; and a channel estimation section that computes a channel estimation value, using the Front-loaded DMRS, in which the Front-loaded DMRS is mapped to a position rearward the control channel in a first slot, and mapped based on a rule specified such that the Front-loaded DMRS does not collide with the control channel in a second or subsequent slot, in which the control section identifies a mapping configuration of the Front-loaded DMRS in the second or subsequent slot based on the rule.

Advantageous Effects of Invention

According to an aspect of the present invention, the collision between the Front-loaded DMRS and the control channel can be prevented when the time direction Bundling is applied.

BRIEF DESCRIPTION OF DRAWINGS

FIGS. 11A to 11F illustrate an exemplary mapping pattern of the Front-loaded DMRS in a mini slot (1 symbol);

FIGS. 12A to 12F illustrate an exemplary mapping pattern of the Front-loaded DMRS in a mini slot (2 symbol);

FIGS. 13A to 13F illustrate an exemplary mapping pattern of the Front-loaded DMRS in a mini slot (3 symbol);

FIGS. 14A to 14D illustrate an exemplary mapping pattern of the Front-loaded DMRS in a mini slot (4 to 14 symbols)

DESCRIPTION OF EMBODIMENTS

Background to Present Invention

The present inventors have studied a problem occurring in mapping a Front-loaded DMRS when time direction Bundling (hereinafter, referred to simply as "Bundling") is applied.

In general, a control channel is mapped from the start of each subcarrier to n (n is any of 1, 2, and 3) symbols in each slot (subframe) in the downlink, and the Front-loaded DMRS is mapped to a symbol immediately after the control channel.

Figure 1:
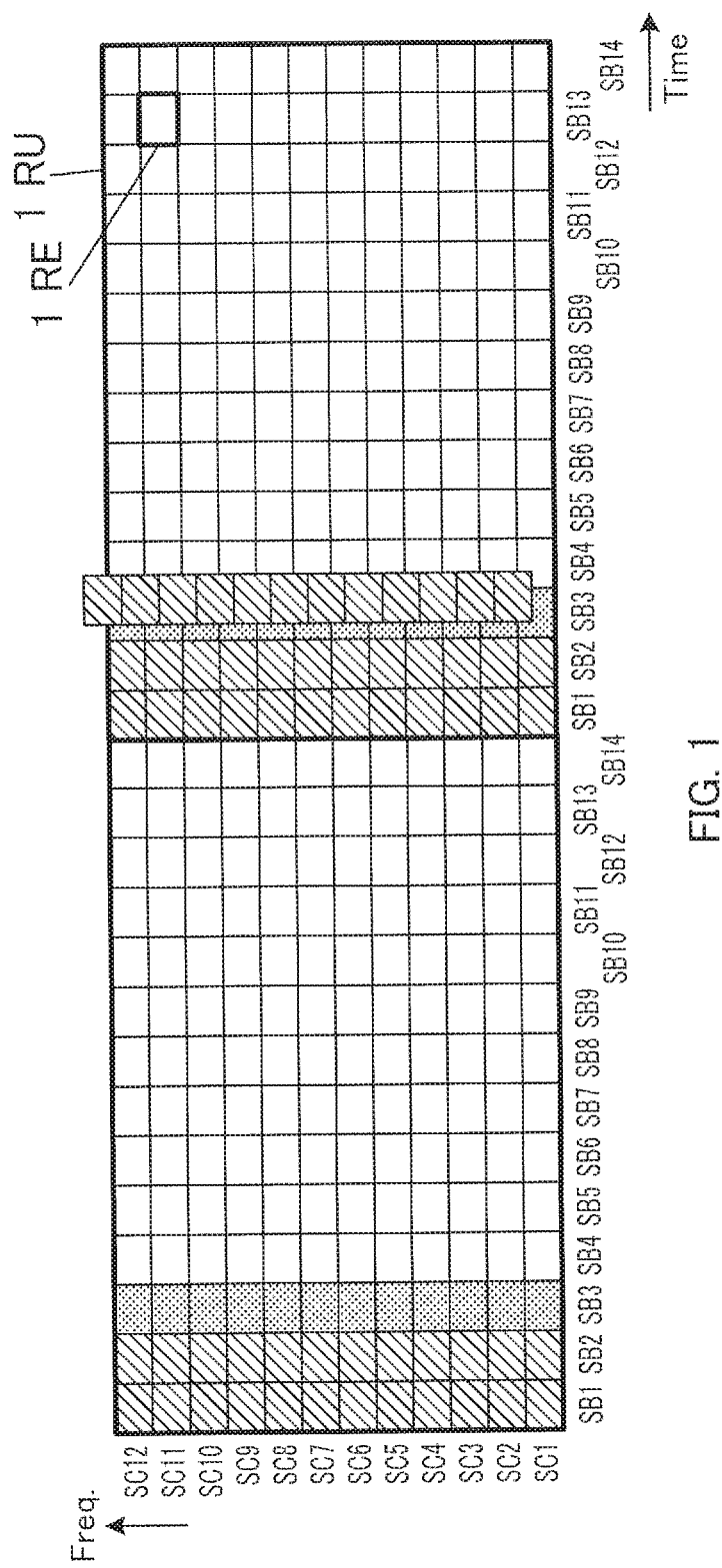
FIG. 1 is a diagram illustrates a probability of a collision between a Front-loaded DMRS and a control channel.

For example, as illustrated in FIG. 1, in a case of a configuration in which a first slot and a second slot are bundled and the control channel is mapped to each slot, a configuration can be thought of in which the control channel is mapped to 2 symbols starting from the start in the first slot and the Front-loaded DMRS is mapped to the third symbol.

Since the Front-loaded DMRS is mapped to a fixed symbol in each slot, and therefore, in a case where the Front-loaded DMRS is similarly mapped to the fixed symbol also when the Bundling is applied, the Front-loaded DMRS is mapped to the third symbol in the second slot also in the example in FIG. 1.

At this time, if the control channel is mapped to 3 symbols starting from the start of the second slot, the Front-loaded DMRS and the control channel collide with each other in the third symbol.

As described above, if the Front-loaded DMRS is always mapped to the fixed symbol in each slot in the Bundling, the Front-loaded DMRS may collide with the control channel in the second or subsequent slot.

The present inventors found the above problem and conceived of mapping of the Front-loaded DMRS in the second and subsequent slots when the Bundling is applied, in order to solve the problem, and then have come to the present invention.

Hereinafter, a description is given of an embodiment of the present invention in detail with reference to the drawings.

Embodiment

Figure 2:
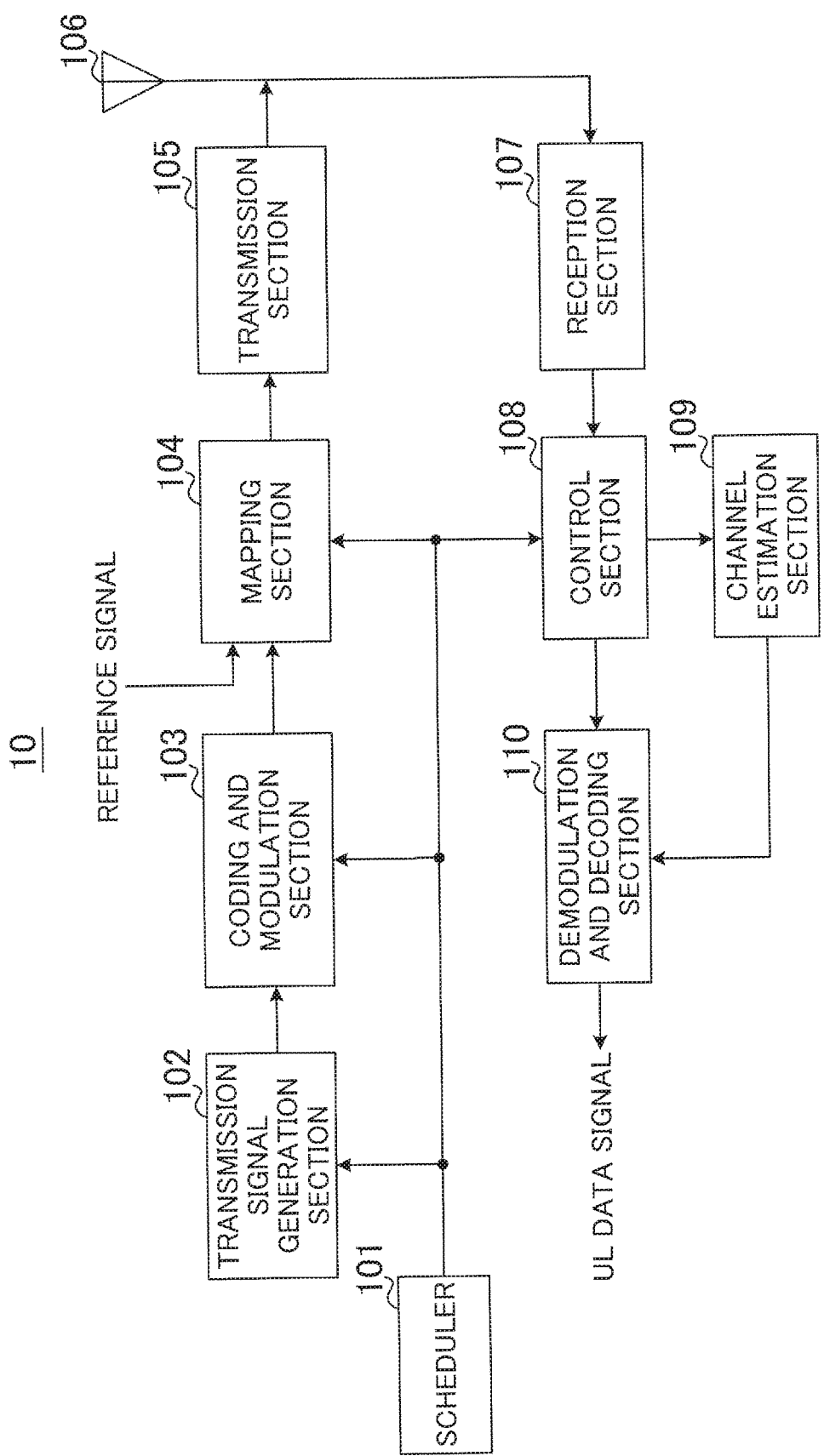
FIG. 2 illustrates an exemplary general configuration of a radio base station according to an embodiment of the present invention.
Figure 3:
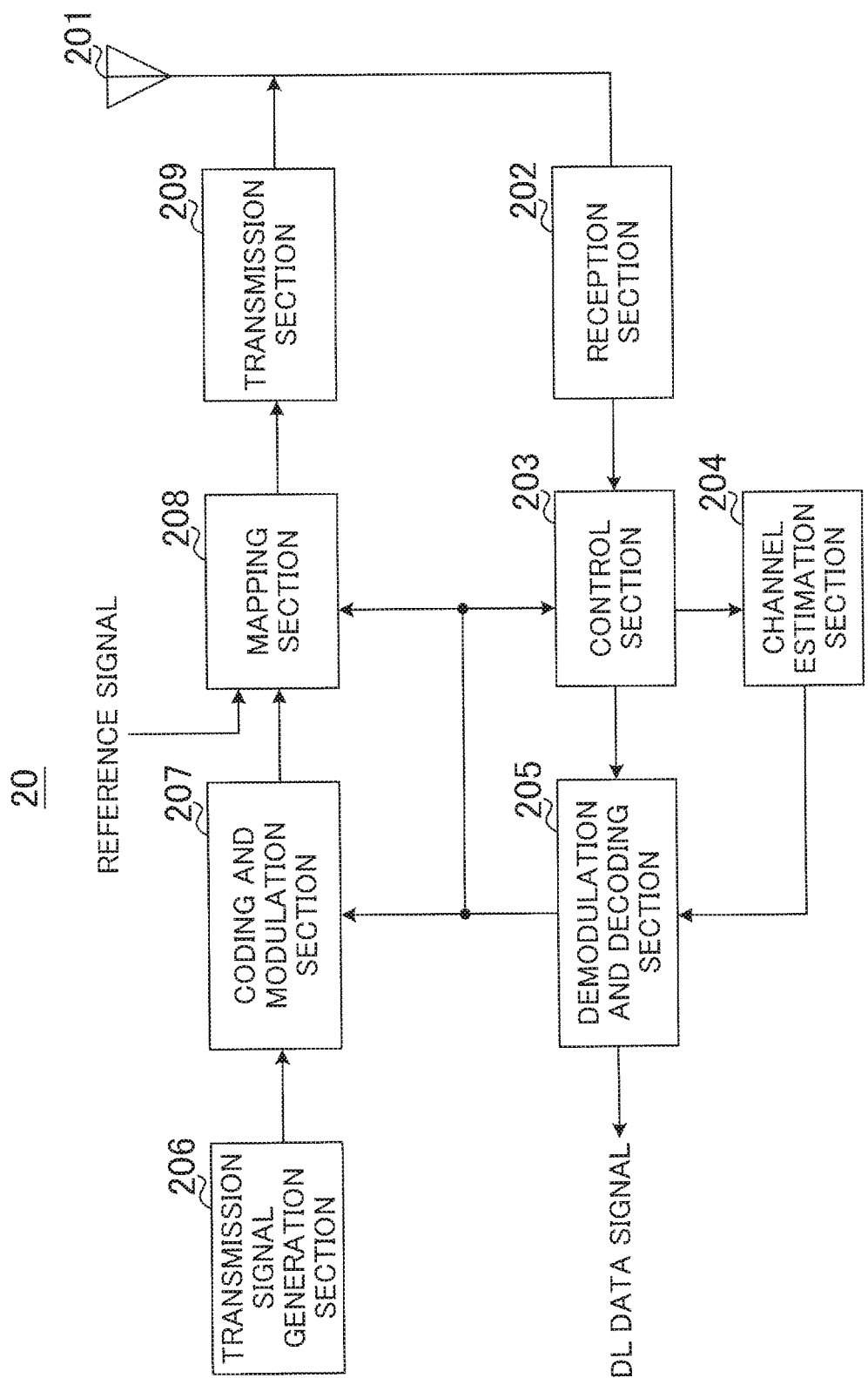
FIG. 3 illustrates an exemplary general configuration of a user terminal according to an embodiment of the present invention.

A radio communication system according to the embodiment includes at least radio base station 10 illustrated in FIG. 2 and user terminal 20 illustrated in FIG. 3. User terminal 20 is connected to radio base station 10.

Radio base station 10 transmits, to user terminal 20, a DL control signal using a downlink control channel (for example, Physical Downlink Control Channel: PDCCH), and a DL data signal and the Front-loaded DMRS using a downlink data channel (for example, downlink shared channel: Physical Downlink Shared Channel: PDSCH). User terminal 20 transmits, to radio base station 10, an UL control signal using an uplink control channel (for example, Physical Uplink Control Channel: PUCCH) or an uplink data channel (for example, uplink shared channel: Physical Uplink Shared Channel: PUSCH), and a UL data signal and the Front-loaded DMRS using an uplink data channel (for example, uplink shared channel: Physical Uplink Shared Channel: PUSCH).

Note that, the downlink channel and the uplink channel transmitted and received by radio base station 10 and user terminal 20 are not limited to PDCCH, PDSCH, PUCCH, PUSCH, and the like described above, and may be another channel such as Physical Broadcast Channel (PBCH) and Random Access Channel (RACH), for example.

In FIG. 2 and FIG. 3, a DL/UL signal waveform generated in radio base station 10 and user terminal 20 may be a signal waveform based on Orthogonal Frequency Division Multiplexing (OFDM) modulation, a signal waveform based on Single Carrier-Frequency Division Multiple Access (SC-FDMA) or DFT-Spread-OFDM (DFT-S-OFDM), or another signal waveform. In FIG. 2 and FIG. 3, illustration of a constituent section for generating a signal waveform (for example, a DFT processing section, an IFFT processing section, a CP addition section, a CP removal section, an FFT processing section, an IDFT processing section, or the like) is omitted.

The radio communication system according to the embodiment can perform transmission and reception between radio base station 10 and user terminal 20 with the time direction Bundling being applied. In the embodiment, radio base station 10 notifies user terminal 20 of whether to apply the time direction Bundling, a Bundling size (the number of slots or the number of subframes to be bundled), and control information of each slot such as a control channel size (the number of symbols) to be bundled (hereinafter, referred to as "Bundling associated information") for each of DL and UL. Note that, the notification method of the Bundling associated information is described later in detail.

<Radio Base Station>

FIG. 2 illustrates an exemplary general configuration of radio base station 10 according to the embodiment. Radio base station 10 illustrated in FIG. 2 is configured to include scheduler 101, transmission signal generation section 102, coding and modulation section 103, mapping section 104, transmission section 105, antenna 106, reception section 107, control section 108, channel estimation section 109, and demodulation and decoding section 110.

Scheduler 101 performs scheduling of a DL signal (such as DL data signal, DL control signal, and Front-loaded DMRS) (for example, resource assignment and antenna port assignment). Scheduler 101 performs scheduling such that the Front-loaded DMRS is mapped to a position that does not collide with the downlink control channel in each slot when downlink Bundling is applied. Alternatively, the Front-loaded DMRS is not inserted not to collide with the downlink control channel.

Scheduler 101 performs scheduling of a UL signal (such as UL data signal, UL control signal, and Front-loaded DMRS) (for example, resource assignment and antenna port assignment). Scheduler 101 performs scheduling such that the Front-loaded DMRS is mapped to a position that does not collide with the control channel in each slot when uplink Bundling is applied. Alternatively, the Front-loaded DMRS is not inserted not to collide with the uplink control channel.

Note that, the mapping rule for the Front-loaded DMRS when the Bundling is applied is described later in detail.

Scheduler 101 outputs scheduling information indicating a scheduling result to transmission signal generation section 102, mapping section 104, and control section 108.

Scheduler 101 configures MCS (such as encoding rate, modulation scheme, or the like) for the DL data signal and the UL data signal based on channel quality between radio base station 10 and user terminal 20, for example, and outputs MCS information to transmission signal generation section 102 and coding and modulation section 103. Note that, the MCS may not be necessarily configured by radio base station 10, and may be configured by user terminal 20. In a case where user terminal 20 configures the MCS, radio base station 10 may receive the MCS information from user terminal 20 (not illustrated).

Transmission signal generation section 102 generates a transmission signal (including DL data signal and DL control signal). For example, the DL control signal includes the scheduling information (for example, resource assignment information of DL data signal) output from scheduler 101, or Downlink Control Information (DCI) including the MCS information. Note that, the DL control signal may include the Bundling associated information. Transmission signal generation section 102 outputs the generated transmission signal to coding and modulation section 103.

Coding and modulation section 103 performs encoding processing and modulation processing on the transmission signal input from transmission signal generation section 102 based on the MCS information input from scheduler 101, for example. Coding and modulation section 103 outputs the modulated transmission signal to mapping section 104.

Mapping section 104 maps the transmission signal input from coding and modulation section 103 to a predetermined radio resource (DL resource) based on the scheduling information input from scheduler 101 (for example, DL resource assignment and/or port assignment). Mapping section 104 maps a reference signal (for example, Front-loaded DMRS) to a predetermined radio resource (DL resource) based on the scheduling information. Mapping section 104 outputs the DL signal mapped to the radio resource to transmission section 105.

Transmission section 105 performs transmission processing such as upconversion and amplification on the DL signal input from mapping section 104, and transmits a radio frequency signal (DL signal) from antenna 106.

Reception section 107 performs reception processing such as amplification and downconversion on the radio frequency signal (UL signal) received by antenna 106, and outputs the UL signal to control section 108.

Control section 108 demaps the UL data signal and the Front-loaded DMRS from the UL signal input from reception section 107 based on the scheduling information (UL resource assignment and/or port assignment) input from scheduler 101. Then, control section 108 outputs the UL data signal to channel estimation section 109.

Channel estimation section 109 performs channel estimation using the Front-loaded DMRS to output a channel estimation value that is an estimation result to demodulation and decoding section 110.

Demodulation and decoding section 110 performs demodulation and decoding processing on the UL data signal input from control section 108 based on the channel estimation value input from channel estimation section 109. Demodulation and decoding section 110 transfers the demodulated UL data signal to an application section (not illustrated). Note that, the application section performs processing concerning a layer higher than a physical layer or a MAC layer.

<User Terminal>

FIG. 3 illustrates an exemplary general configuration of user terminal 20 according to the embodiment. User terminal 20 illustrated in FIG. 3 is configured to include antenna 201, reception section 202, control section 203, channel estimation section 204, demodulation and decoding section 205, transmission signal generation section 206, coding and modulation section 207, mapping section 208, and transmission section 209. User terminal 20 performs the reception processing on the radio frequency signal received by the antenna port assigned to user terminal 20 itself.

Reception section 202 performs the reception processing such as amplification and downconversion on the radio frequency signal (DL signal) received by antenna 201. and outputs the DL signal to control section 203. DL signal includes at least the DL data signal, the DL control signal, and the Front-loaded DMRS.

Control section 203 demaps the DL control signal and the Front-loaded DMRS from the DL signal input from reception section 202. Note that, control section 203 identifies a mapping configuration for the Front-loaded DMRS in each slot (whether to map or not and/or mapping position) based on the rule described later. Then, control section 203 outputs the DL control signal to demodulation and decoding section 205, and outputs the Front-loaded DMRS to channel estimation section 204.

Control section 203 demaps the DL data signal from the DL signal based on the scheduling information (for example, DL resource assignment information) input from demodulation and decoding section 205, and outputs the DL data signal to demodulation and decoding section 205.

Channel estimation section 204 performs the channel estimation using the demapped Front-loaded DMRS, and outputs a channel estimation value that is an estimation result to demodulation and decoding section 205.

Demodulation and decoding section 205 demodulates the DL control signal input from control section 203. Demodulation and decoding section 205 performs decoding processing (for example, blind detection processing) on the demodulated DL control signal. Demodulation and decoding section 205 outputs the scheduling information destined for demodulation and decoding section 205 (DL/UL resource assignment, Front-loaded DMRS mapping configuration, and the like) obtained by decoding the DL control signal to control section 203 and mapping section 208, and outputs the MCS information for the UL data signal to coding and modulation section 207.

Demodulation and decoding section 205 performs the demodulation and decoding processing on the DL data signal input from control section 203 based on the channel estimation value input from control section 203 and the MCS information for the DL data signal included in the DL control signal. Demodulation and decoding section 205 transfers the demodulated DL data signal to the application section (not illustrated). Note that, the application section performs processing concerning a layer higher than a physical layer or a MAC layer.

Transmission signal generation section 206 generates a transmission signal (including a UL data signal or a UL control signal) and outputs the generated transmission signal to coding and modulation section 207.

Coding and modulation section 207 performs the encoding processing and the modulation processing on the transmission signal input from transmission signal generation section 206 based on the MCS information input from demodulation and decoding section 205, for example. Coding and modulation section 207 outputs the modulated transmission signal to mapping section 208.

Mapping section 208 maps the transmission signal input from coding and modulation section 207 to a predetermined radio resource (UL resource) based on the scheduling information (UL resource assignment) input from demodulation and decoding section 205. Mapping section 208 maps the reference signal (for example, Front-loaded DMRS) to a predetermined radio resource (UL resource) based on the scheduling information (for example, Front-loaded DMRS mapping configuration). Note that, mapping section 208 selects a mapping configuration for the Front-loaded DMRS in each slot (whether to map or not and/or mapping position) based on a rule described later.

Mapping section 208 outputs the UL signal mapped to the radio resource to transmission section 209.

Transmission section 209 performs the transmission processing such as upconversion and amplification on the UL signal (including at least UL data signal and Front-loaded DMRS) input from mapping section 208, and transmits the radio frequency signal (UL signal) from antenna 201.

<Notification Method of Bundling Associated Information>

Figure 4A:
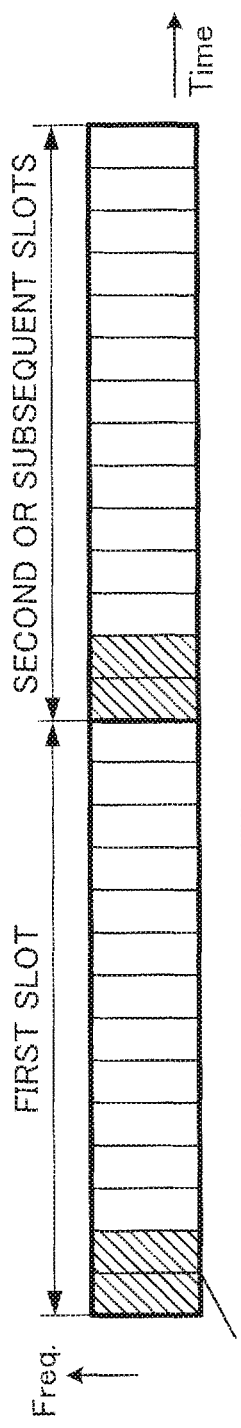
FIGS. 4A to 4C illustrate a specific example of a notification method of Bundling associated information in an embodiment of the present invention.
Figure 4B:
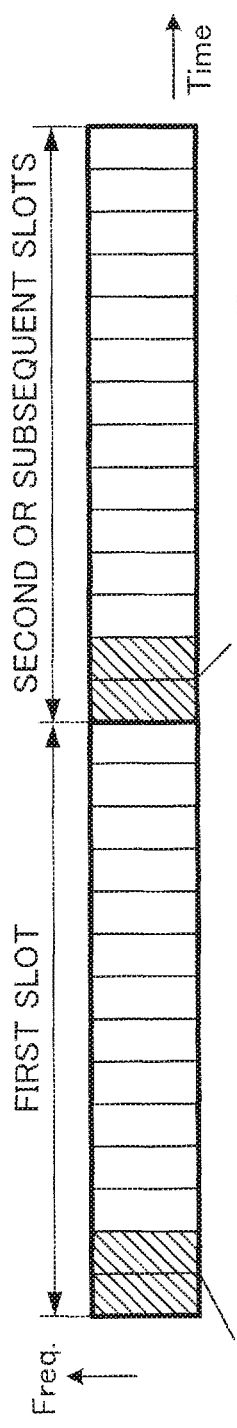
Figure 4C:
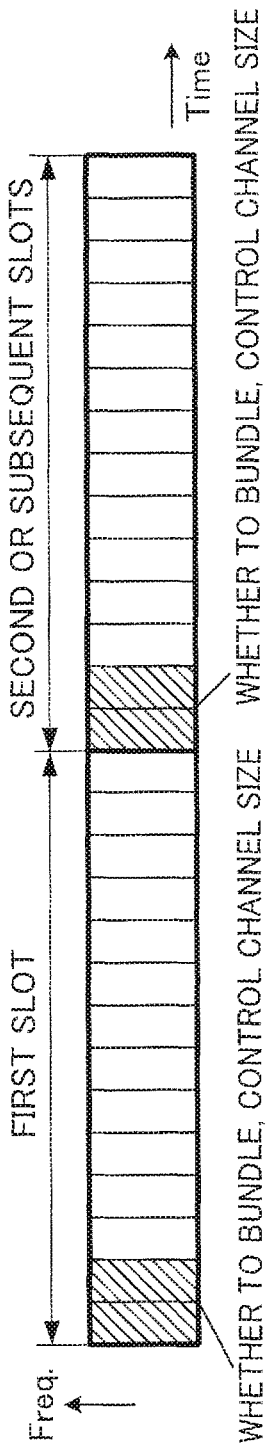

Next, a description is given in detail of a specific example of a notification method of downlink time direction Bundling associated information using FIGS. 4A to 4C.

[First Notification Method]

In a first notification method, as illustrated in FIG. 4A, radio base station 10 uses a control channel (PDCCH) in the first (start) slot to notify whether to apply the time direction Bundling, a Bundling size, and a control channel size in the first slot, and when the Bundling is applied, uses the control channel in the first slot to further notify a control channel size in each of the second and subsequent slots.

[Second Notification Method]

In a second notification method, as illustrated in FIG. 4B, radio base station 10 uses a control channel in the first slot to notify whether to apply the time direction Bundling, a Bundling size, and a control channel size in the first slot, and when the Bundling is applied, uses a control channel in each of the second and subsequent slots to notify a control channel size of the relevant slot.

[Third Notification Method]

In a third notification method, as illustrated in FIG. 4C, radio base station 10 uses a control channel in each slot to notify whether to apply the time direction Bundling and a control channel size in the relevant slot.

[Another Notification Method]

Note that, radio base station 10 may notify user terminal 20 of the control channel size in each slot explicitly or implicitly.

For example, in a case where the control channel size is explicitly notified, radio base station 10 may notify user terminal 20 of the control channel size through Radio Resource Control (RRC) signaling, Medium Access Control (MAC) signaling, physical layer (PHY) signaling, and the like. As an example, radio base station 10 may notify user terminal 20 of the control channel size using Master Information Block (MIB) transmitted on PBCH, RACH message 2 (Random Access Response: also referred as RAR), RACH message 3, and RACH message 4 used in random access processing, System Information Block (SIB), RRC, Downlink Control Information (DCI), or the like.

Radio base station 10 and user terminal 20 may, for example, associate a configuration or the like of a Synchronization Signal (SS), PBCH, SIB, or RACH with the control channel size such that the configuration of SS or the like and the control channel size have a one-to-one correspondence when the control channel size is implicitly notified. For example, when a plurality of patterns of configuration are specified for each configuration of SS, PBCH, SIB, and RACH, the plurality of patterns may be grouped into groups associated with the respective control channel sizes. In grouping, the control channel size suitable for use in a communication environment in which one of the plurality of patterns (for example, one of the plurality of patterns in which subcarrier spacings of SS are different from each other) is used may be associated with the one of the plurality of patterns.

Radio base station 10 transmits a signal of a group associated with the control channel size to user terminal 20. User terminal 20 identifies the control channel size associated with the group to which the signal transmitted by radio base station 10 belongs. This achieves implicit notification of the control channel size using the existing signals, so that no new signaling is necessary for notification of the control channel size, and overhead can be reduced.

Radio base station 10 may not notify user terminal 20 of the control channel size in each slot, and user terminal 20 may estimate the control channel size in a blind manner. This can reduce the signaling for notification of the control channel size to reduce the overhead.

[Notification Method of Uplink Bundling Associated Information]

Radio base station 10 notifies user terminal 20 of uplink Bundling associated information using the downlink control channel. Alternatively, radio base station 10 may notify user terminal 20 of the uplink Bundling associated information explicitly or implicitly.

<Mapping Rule for Front-Loaded DMRS>

Next, a description is given in detail of a specific example of the mapping rule for the Front-loaded DMRS when the Bundling is applied using FIG. 5 to FIG. 8. FIG. 5 to FIG. 8 illustrate the mapping position for the Front-loaded DMRS in a Resource Unit (RU) (also referred to as resource block, resource block pair or the like) that is a resource assignment unit.

The RU has a configuration in which 168 Resource Elements (REs) are arranged, specifically 14 resource elements in the time direction and 12 resource elements in a frequency direction. One RE is a radio resource domain defined by one symbol and one subcarrier. In other words, one RU is composed of 14 symbols and 12 subcarriers.

Note that, in the following description, 14 symbols of the RU in the time direction are called SB1 to SB14 in the order presented from the left. Additionally, 12 subcarriers of the RU in the frequency direction are called SC1 to SC12 in the order presented from the bottom.

Assume that, as being common to FIG. 5 to FIG. 8, radio base station 10 (user terminal 20) bundles three slots, maps the control channel to 2 symbols (SB1, SB2) starting from the start of each subcarrier in the first slot, and maps the Front-loaded DMRS to the third symbol (SB3).

[First Mapping Rule]

A first mapping rule specifies that the Front-loaded DMRS is not mapped to a slot of the second and subsequent slots bundled in which the control channel is mapped to a symbol position corresponding to that in the first slot to which the Front-loaded DMRS is mapped.

Figure 5:
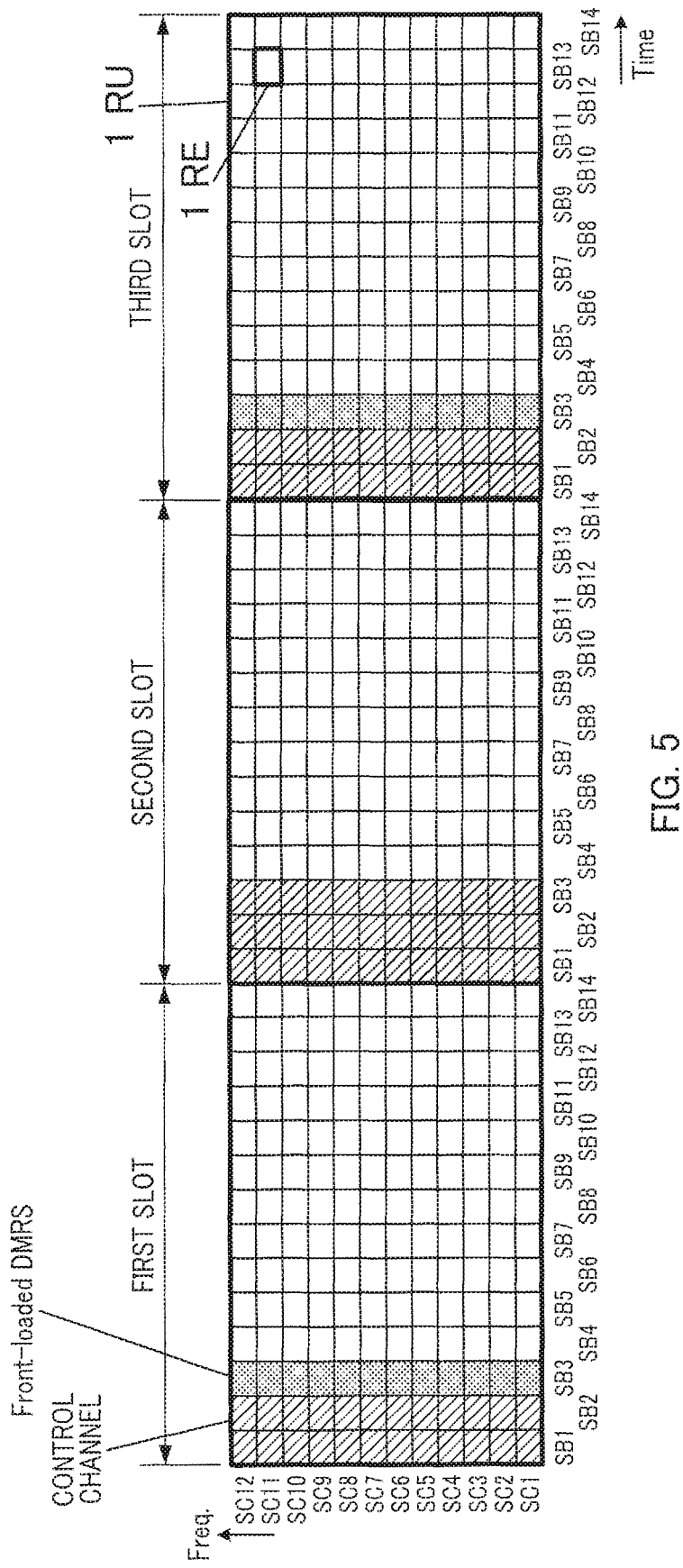
FIG. 5 illustrates a specific example of a mapping rule for the Front-loaded DMRS (a first mapping rule) in an embodiment of the present invention.

For example, as illustrated in FIG. 5, in a case where the control channel is mapped to 3 symbols (SB1, SB2, SB3) starting from the start of the second slot, radio base station 10 (user terminal 20) does not map the Front-loaded DMRS to the second slot. Note that, radio base station 10 (user terminal 20) maps the Front-loaded DMRS to the third symbol (SB3) in the third slot where the control channel is mapped to 2 symbols (SB1, SB2) starting from the start of the third slot.

This eliminates new signaling necessary for notification of the mapping configuration of the Front-loaded DMRS in the second and subsequent slots, and the overhead can be reduced.

In this case, user terminal 20 (radio base station 10) on the reception side performs the channel estimation using the Front-loaded DMRS and Additional DMRS (not illustrated) mapped to the first and third slots.

[Second Mapping Rule]

A second mapping rule specifics that the Front-loaded DMRS is not mapped to a slot of the second and subsequent slots bundled.

Figure 6:
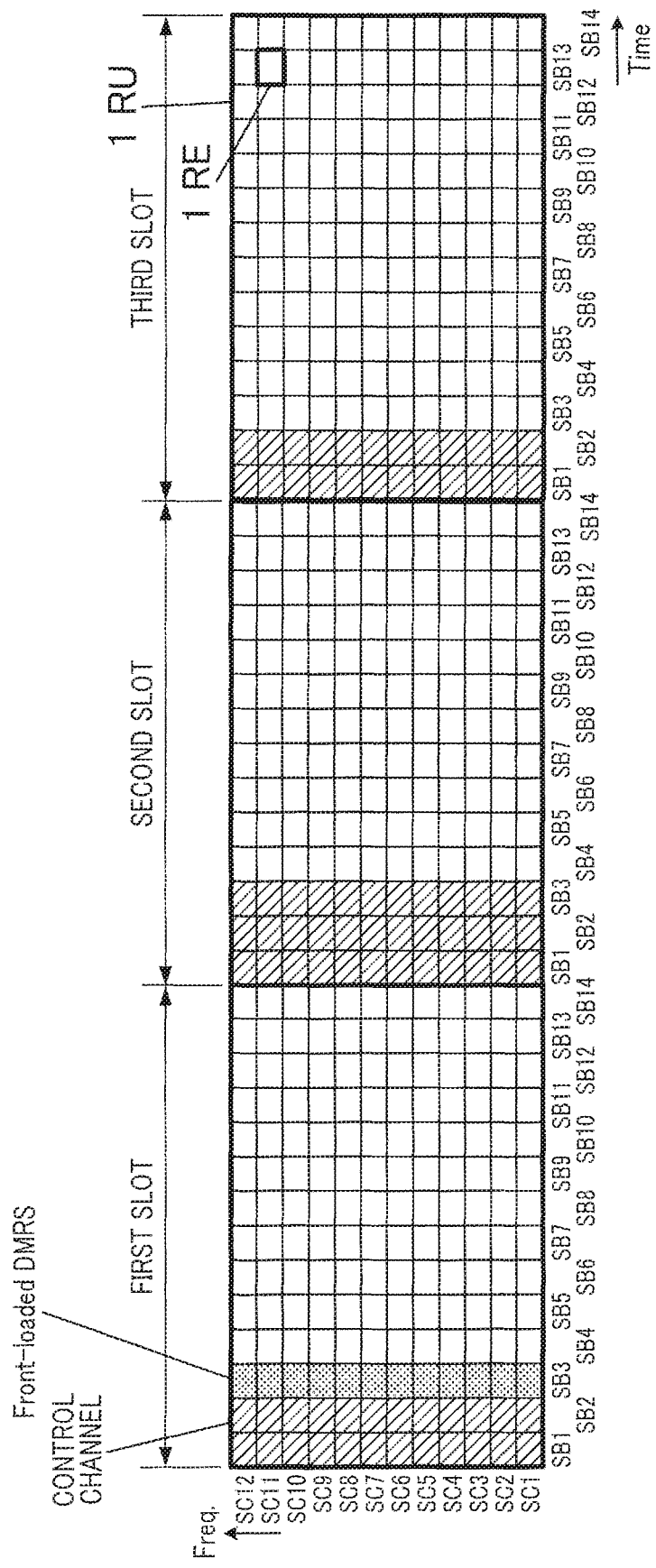
FIG. 6 illustrates a specific example of a mapping rule for the Front-loaded DMRS (a second mapping rule) in an embodiment of the present invention.

For example, as illustrated in FIG. 6, radio base station 10 (user terminal 20) does not map the Front-loaded DMRS to the second slot or the third slot.

This eliminates new signaling necessary for notification of the mapping configuration of the Front-loaded DMRS in the second or subsequent slot, and the overhead can be reduced.

In this case, user terminal 20 (radio base station 10) on the reception side performs the channel estimation using the Front-loaded DMRS and Additional DMRS (not illustrated) mapped to the first slot.

[Third Mapping Rule]

A third mapping rule specifies that the Front-loaded DMRS is mapped immediately after the symbol to which the control channel is mapped in each of the second and subsequent slots bundled.

Figure 7:
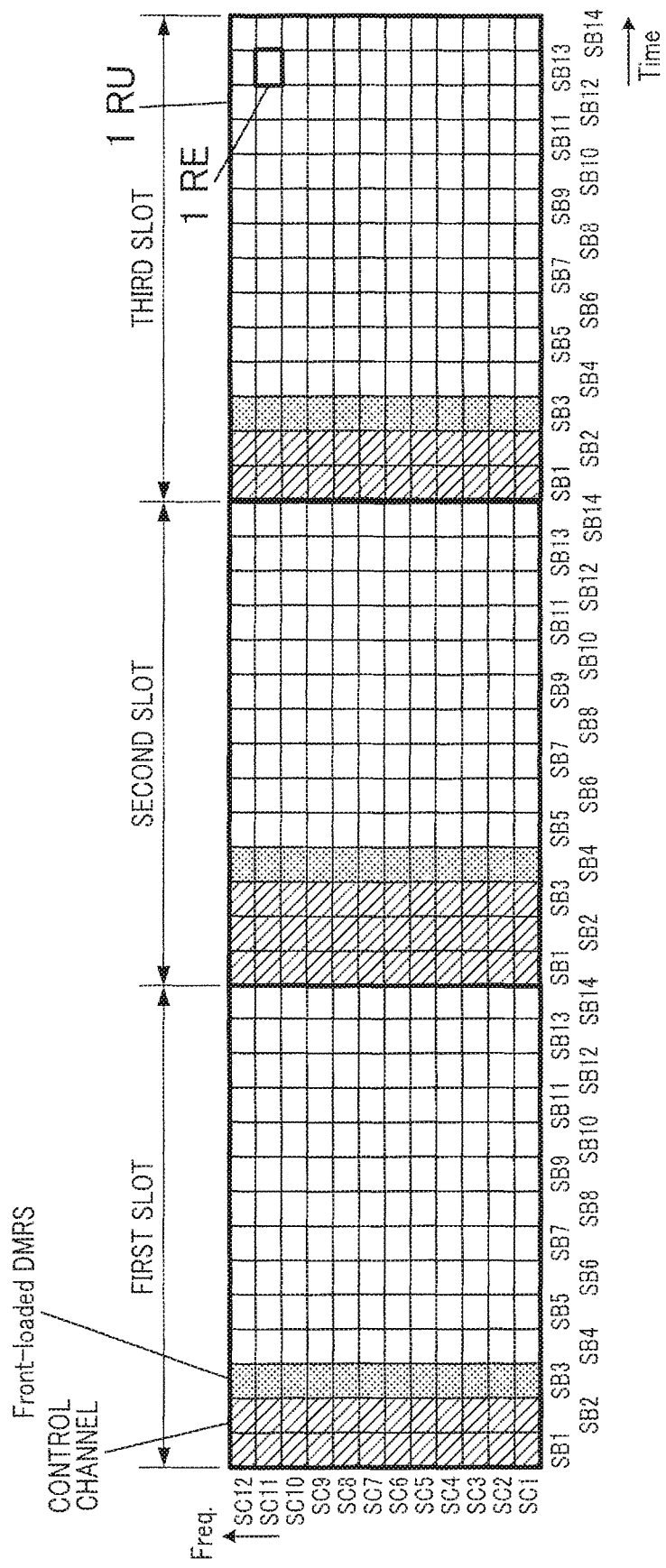
FIG. 7 illustrates a specific example of a mapping rule for the Front-loaded DMRS (a third mapping rule) in an embodiment of the present invention.

For example, as illustrate in FIG. 7, in a case where the control channel is mapped to 3 symbols (SB1, SB2, SB3) starting from the start of the second slot, and the control channel is mapped to 2 symbols (SB1, SB2) starting from the start of the third slot, radio base station 10 (user terminal 20) maps the Front-loaded DMRS to the fourth symbol (SB4) in the second slot and the third symbol (SB3) in the third slot.

This eliminates new signaling necessary for notification of the mapping configuration of the Front-loaded DMRS in the second or subsequent slot, and the overhead can be reduced.

In this case, user terminal 20 (radio base station 10) on the reception side performs the channel estimation using the Front-loaded DMRS and Additional DMRS (not illustrated) mapped to each slot.

Note that, in a case where no symbol can be mapped immediately after a symbol to which the control channel is mapped (a case where the control channel is mapped to the all symbols) in each slot, radio base station 10 (user terminal 20) does not map the Front-loaded DMRS to the relevant slot.

[Fourth Mapping Rule]

A fourth mapping rule specifies that radio base station 10 determines the mapping configuration of the Front-loaded DMRS (whether to map or not and/or mapping position) such that the Front-loaded DMRS does not collide with the control channel in each of the second and subsequent slots bundled.

In the fourth mapping rule, radio base station 10 notifies user terminal 20 of the mapping configuration of the Front-loaded DMRS through signaling. User terminal 20 demaps or maps the Front-loaded DMRS according to content notified through signaling. According to the fourth mapping rule, the Front-loaded DMRS can be flexibly mapped depending on a propagation environment between radio base station 10 and user terminal 20, a movement speed of user terminal 20, processing capability, and the like.

Figure 8:
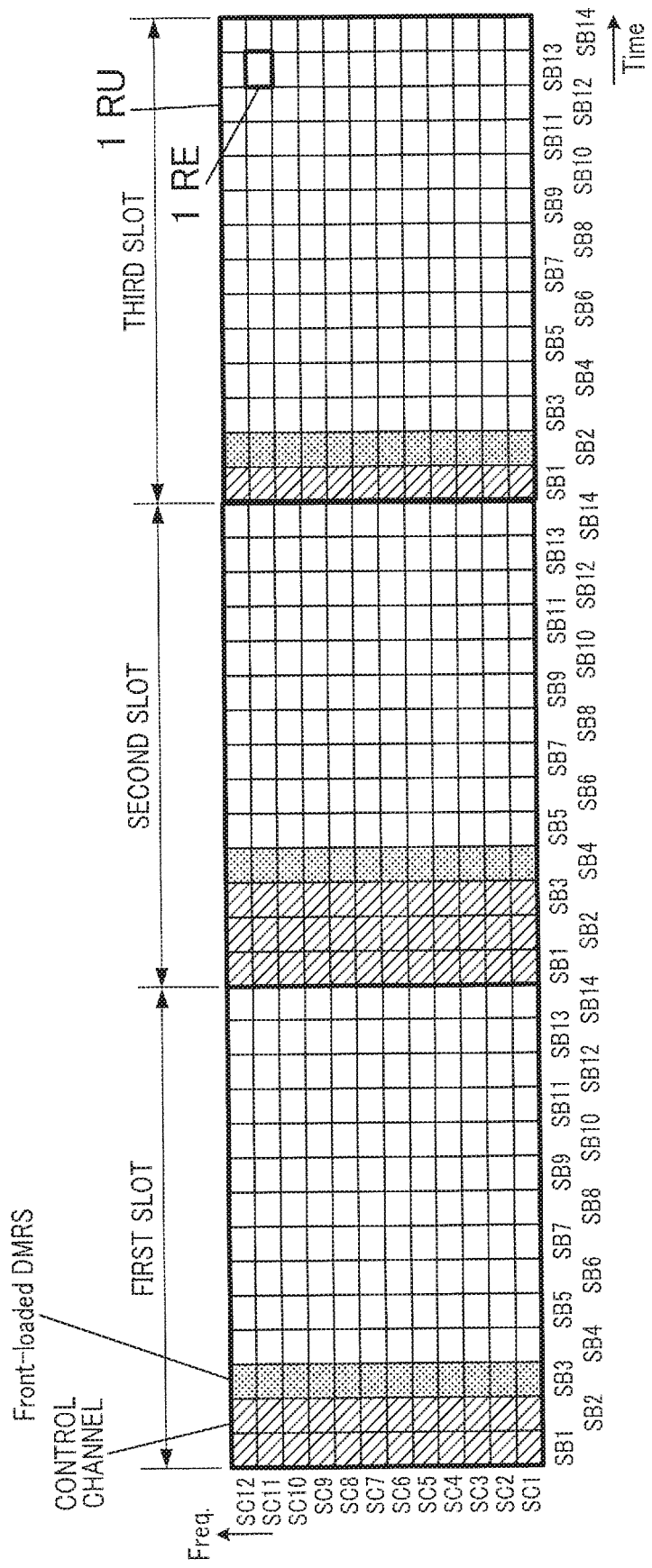
FIG. 8 illustrates a specific example of a mapping rule for the Front-loaded DMRS (a fourth mapping rule) in an embodiment of the present invention.

For example, as illustrated in FIG. 8, radio base station 10 determines that the Front-loaded DMRS is mapped to the fourth symbol (SB4) in the second slot and the second symbol (SB2) in the third slot, and notifies user terminal 20 through signaling. At this time, since the control channel is mapped to 3 symbols (SB1, SB2, SB3) starting from the start of the second slot, and the control channel is mapped to the first symbol (SB1) in the third slot, the Front-loaded DMRS collides with no control channel.

In this case, user terminal 20 (radio base station 10) on the reception side performs the channel estimation using the Front-loaded DMRS and Additional DMRS (not illustrated) mapped to each slot.

Note that, according the mapping rule, the mapping position of the Front-loaded DMRS may be different for each slot, or may be common to the all slots.

According to the fourth mapping rule, radio base station 10 may notify of the signaling for each slot, or collectively notify of a configuration common to the second and subsequent slots. Radio base station 10 may notify of the signaling for the second or subsequent slot in the same way as for the first slot, or in a way different from for the first slot. For example, the notification for the first slot may be dynamically made through the DCI, and the notification for the second or subsequent slot may be statically made through the RRC.

The signaling described above may be the signaling specific to each user terminal 20, or the signaling common for each assigned RB, each subband, each resource block group (RBG), each component carrier (CC), each cell, or each carrier frequency. The signaling described above may be any of RRC signaling, MAC signaling, and PHYY signaling. The signaling described above may be notified periodically or dynamically (aperiodically).

<Effects of Embodiment>

In this way, according to the embodiment, radio base station 10 and user terminal 20 controls the mapping configuration (whether to map or not and/or mapping position) of the Front-loaded DMRS in each of the second and subsequent slots when the Bundling is applied, in accordance to the rule for preventing the collision with the control channel. This can prevent the Front-loaded DMRS from colliding with control channel when the Bundling is applied.

According to the embodiment, the mapping configuration of the Front-loaded DMRS in each of the second and subsequent slots is associated with the mapping position of the Front-loaded DMRS in the first slot, or configured in advance. This can eliminate new signaling and can reduce the overhead.

According to the embodiment, the mapping configuration of the Front-loaded DMRS in each of the second and subsequent slots is adequately determined and notified through signaling. This allows the Front-loaded DMRS to be flexibly mapped depending on the propagation environment.

Note that, in the embodiment, the symbol position of the control channel is not limited to those illustrated in FIG. 5 to FIG. 8, and may be mapped to only a subcarrier (RE) of a part of the symbol, for example.

The mapping rule for the Front-loaded DMRS applied to the embodiment may be notified from each radio base station 10 to user terminal 20 through signaling, or may be described in a specification. The rule described in the specification may be changed through signaling.

According to the embodiment, a plurality of mapping rules for the Front-loaded DMRS may be combined and applied in the bundled slots.

<Application Example of Mini Slot>

The above example describes the mapping pattern in the RU having the configuration in which 168 REs are arranged, specifically 14 elements in the time direction and 12 elements in the frequency direction, but the present invention is not limited thereto. For example, the present invention is applied to a mapping of the Front-loaded DMRS in a resource assignment unit called a mini slot in which the number of symbols is any of 1 to 14.

Application Example 1

Figure 9:
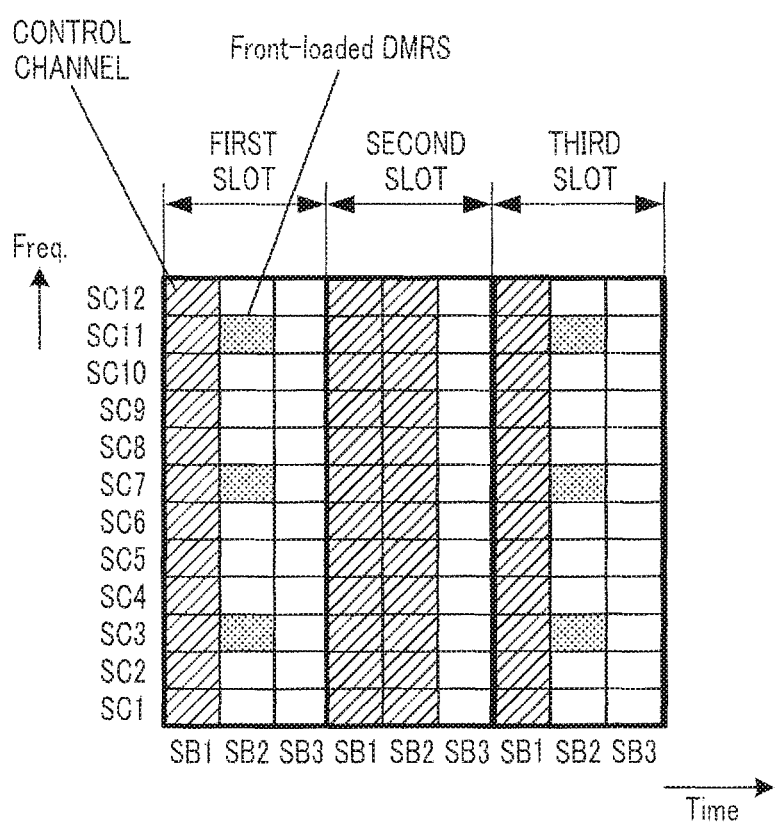
FIG. 9 illustrates a specific example in a case where the mapping rule for the Front-loaded DMRS (the first mapping rule) is applied to a mini slot in an embodiment of the present invention.

FIG. 9 illustrates an example of a case where the first mapping rule above is applied to the mini slot having 3 symbols. In the example in FIG. 9, radio base station 10 (user terminal 20) maps the control channel to the first symbol (SB1) in each of the first and third slots, and maps the control channel to 2 symbols (SB1, SB2) starting from the start of the second slot.

In this case, radio base station 10 (user terminal 20) does not map the Front-loaded DMRS to the second slot. Note that, radio base station 10 (user terminal 20) maps the Front-loaded DMRS to the second symbol (SB2) in the third slot.

User terminal 20 (radio base station 10) on the reception side performs the channel estimation using the Front-loaded DMRS and Additional DMRS (not illustrated) mapped to the first and third slots.

Application Example 2

Figure 10:
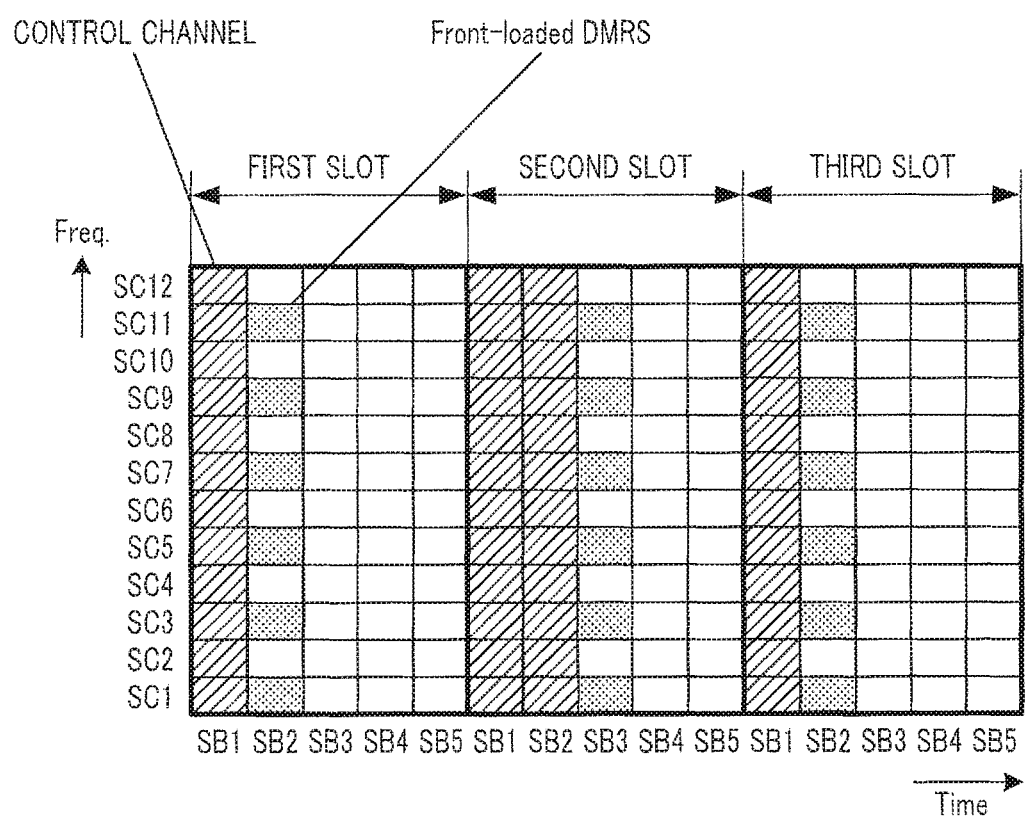
FIG. 10 illustrates a specific example in a case where the mapping rule for the Front-loaded DMRS (the third mapping rule) is applied to a mini slot in an embodiment of the present invention.

FIG. 10 illustrates an example of a case where the third mapping rule above is applied to the mini slot having 5 symbols. In the example in FIG. 10, radio base station (user terminal 20) maps the control channel to the first symbol (SB1) in each of the first and third slots, and maps the control channel to 2 symbols (SB1, SB2) starting from the start of the second slot.

In this case, radio base station 10 (user terminal 20) maps the Front-loaded DMRS to the third symbol (SB3) in the second slot and the second symbol (SB2) in the third slot.

User terminal 20 (radio base station 10) on the reception side performs the channel estimation using the Front-loaded DMRS and Additional DMRS (not illustrated) mapped to each slot.

Note that, in the embodiment, the symbol position of the mini slot is not limited to those illustrated in FIG. 9 and FIG. 10. The mini slots different in the number of symbols may be present when the bundling is applied. In this case, even in the case where the first mapping rule described above is applied, another mapping rule may be applied to a slot different in the number of symbols from the first slot.

<Front-Loaded DMRS Mapping Pattern Example in Mini Slot>

Next, a description is given of an example of the mapping pattern of the Front-loaded DMRS in the mini slot using FIG. 11A to FIG. 14D.

[Mini Slot Having 1 Symbol]

FIGS. 11A to 11F illustrate an exemplary mapping pattern of the Front-loaded DMRS in the mini slot having 1 symbol. FIG. 11A illustrates an example that the Front-loaded DMRS is mapped to the first, third, fifth, seventh, ninth, and eleventh subcarriers. FIG. 11B illustrates an example that the Front-loaded DMRS is mapped to the third, seventh, and eleventh subcarriers. FIG. 11C illustrates an example that the Front-loaded DMRS is mapped to the first, second, seventh, and eighth subcarriers. FIG. 11D illustrates an example that the Front-loaded DMRS is mapped to the third and ninth subcarriers. FIG. 11E illustrates an example that the Front-loaded DMRS is mapped to the sixth and seventh subcarriers. FIG. 11F illustrates an example that the Front-loaded DMRS is mapped to the sixth subcarrier.

[Mini Slot Having 2 Symbols]

FIGS. 12A to 12F illustrate an exemplary mapping pattern of the Front-loaded DMRS in the mini slot having 2 symbols. Note that, FIGS. 12A to 12F all illustrate a case that the control channel is mapped to the first symbol of every subcarrier.

FIG. 12A illustrates an example that the Front-loaded DMRS is mapped to the first, third, fifth, seventh, ninth, and eleventh subcarriers in the second symbol (SB2). FIG. 12B illustrates an example that the Front-loaded DMRS is mapped to the third, seventh, and eleventh subcarriers in the second symbol (SB2). FIG. 12C illustrates an example that the Front-loaded DMRS is mapped to the first, second, seventh, and eighth subcarriers in the second symbol (SB2). FIG. 12D illustrates an example that the Front-loaded DMRS is mapped to the third and ninth subcarriers in the second symbol (SB2). FIG. 12E illustrates an example that the Front-loaded DMRS is mapped to the sixth and seventh subcarriers in the second symbol (SB2). FIG. 12F illustrates an example that the Front-loaded DMRS is mapped to the sixth subcarrier in the second symbol (SB2).

[Mini Slot Having 3 Symbols]

FIGS. 13A to 13F illustrate an exemplary mapping pattern of the Front-loaded DMRS in the mini slot having 3 symbols. Note that, FIGS. 13A to 13F all illustrate a case that the control channel is mapped to the first symbol of every subcarrier.

FIG. 13A illustrates an example that the Front-loaded DMRS is mapped to the first, third, fifth, seventh, ninth, and eleventh subcarriers in the second symbol (SB2). FIG. 13B illustrates an example that the Front-loaded DMRS is mapped to the third, seventh, and eleventh subcarriers in the second symbol (SB2). FIG. 13C illustrates an example that the Front-loaded DMRS is mapped to the third, fourth, fifth, and sixth subcarriers in the second symbol (SB2). FIG. 13D illustrates an example that the Front-loaded DMRS is mapped to the third and ninth subcarriers in the second symbol (SB2). FIG. 13E illustrates an example that the Front-loaded DMRS is mapped to the sixth and seventh subcarriers in the second symbol (SB2). FIG. 13F illustrates an example that the Front-loaded DMRS is mapped to the sixth subcarrier in the second symbol (SB2).

[Mini Slot Having 4 to 14 Symbols]

FIGS. 14A to 14D illustrate an exemplary mapping pattern of the Front-loaded DMRS in the mini slot having 4 to 14 symbols. Note that, FIGS. 14A to 14D all illustrate a case that the control channel is mapped to the first symbol of every subcarrier.

FIG. 14A illustrates an example that the Front-loaded DMRS is mapped to the first, third, fifth, seventh, ninth, and eleventh subcarriers in the second symbol (SB2). FIG. 14B illustrates an example that the Front-loaded DMRS is mapped to the first, third, fifth, seventh, ninth, and eleventh subcarriers in the second and third symbols (SB2, SB3). FIG. 14C illustrates an example that the Front-loaded DMRS is mapped to the first, second, seventh, and eighth subcarriers in the second symbol (SB2). FIG. 14D illustrates an example that the Front-loaded DMRS is mapped to the first, second, seventh, and eighth subcarriers in the second and third symbols (SB2, SB3).

<Others>

Note that, in the embodiment, any of the first to fourth mapping rules for the Front-loaded DMRS may be applied in common to all user terminals 20 located in the same cell, or may be adequately selected for each user terminal 20. The mapping rule in common to all radio base stations 10 may be applied to radio base stations 10, or the mapping rule may be adequately selected for each radio base station 10.

According to the embodiment, each radio base station 10 may select any of the first to fourth mapping rules for the Front-loaded DMRS depending on the data channel. For example, each radio base station 10, when mapping the Front-loaded DMRS for a subframe including a specific data channel, may select the prescribed mapping rule. The specific data channel is, for example, a data channel including System Information, a data channel including a Signaling Radio Bearer (SRB), a data channel including a Hand over command, a data channel scheduled by Downlink Control Information (DCI) transmitted via a Common search space, a data channel including an Activation command, and the like.

According to the embodiment, radio base station 10 may map the Front-loaded DMRS such that the Front-loaded DMRSs are orthogonal to each other between the layers (layer multiplexing), or such that the Front-loaded DMRSs are common to the layers (one-layer transmission). Radio base station 10 may set an antenna port number to be common to any port number of the Front-loaded DMRS, or to be a different port number.

Note that, the Front-loaded DMRS described above may be called a demodulation RS. The Front-loaded DMRS may be called a reference signal or the like.

Hereinabove, the embodiments of the present invention are described.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 15:
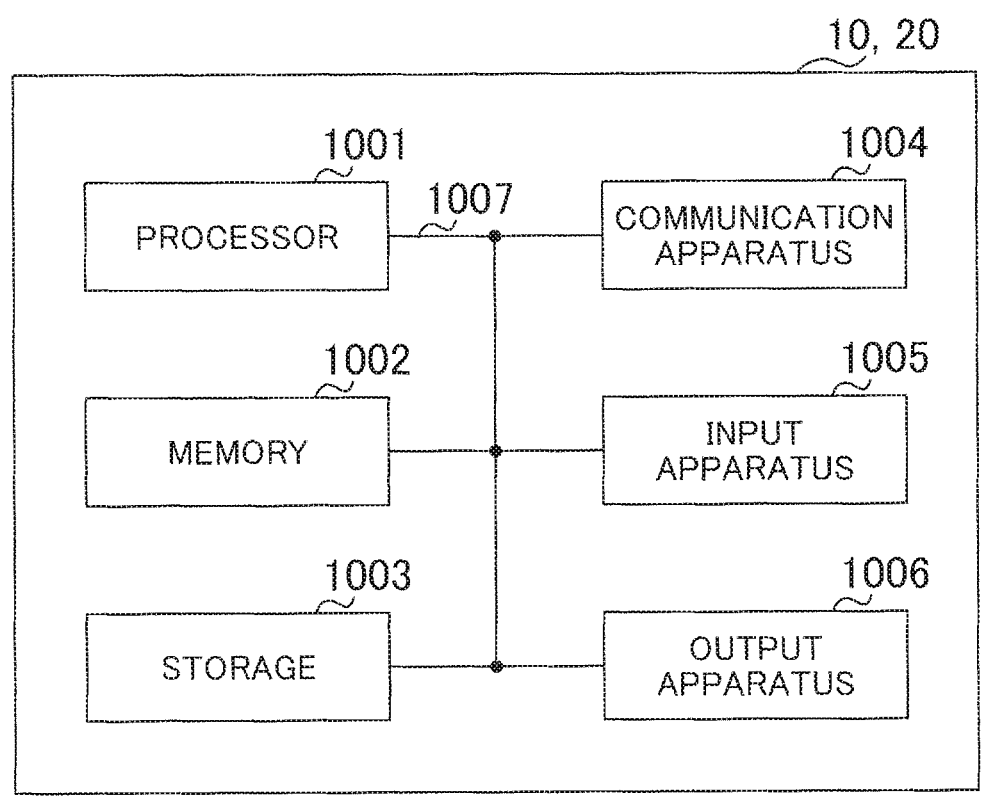
FIG. 15 illustrates an exemplary hardware configuration of the radio base station and the user terminal according to an embodiment of the present invention.

For example, the radio base station, the user terminal, and the like according to an embodiment of the present invention may function as a computer that executes processing of a radio communication method of the present invention. FIG. 15 illustrates an example of a hardware configuration of the radio base station and the user terminal according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, scheduler 101, control sections 108 and 203, transmission signal generation sections 102 and 206, coding and modulation sections 103 and 207, mapping sections 104 and 208, channel estimation sections 109 and 204, demodulation and decoding sections 110 and 205, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission sections 105 and 209, antennas 106 and 201, reception sections 107 and 202, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), ITE-A (LTE-Advanced), SUPER 3G, IMT-Advanced, 4G, 5G FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "gNB," "cell," and "sector" can be interchangeably used in the present specification. The base station may be called a fixed station, a NodeB, an eNodeB (eNB), a gNodeB, an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (for example, looking up in a table, a database or another data structure), ascertaining and the like. Also, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The Front-loaded DMRS may be called by another corresponding name.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the ITE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, one slot, or one mini slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a mobile communication system.

REFERENCE SIGNS LIST

10 Radio Base Station
20 User Terminal
101 Scheduler
102, 206 Transmission Signal Generation Section
103, 207 Coding and modulation Section
104, 208 Mapping Section
105, 209 Transmission Section
106, 201 Antenna
107, 202 Reception Section
108, 203 Control Section
109, 204 Channel Estimation Section
110, 205 Demodulation and decoding Section

The invention claimed is:

1. A terminal, comprising:
   receiver that receives a downlink signal including a control channel and a Front-loaded Demodulation Reference Signal (DMRS) with a plurality of slots being bundled;
   a processor that:
      demaps the control channel and the Front-loaded DMRS from the downlink signal, and
      computes a channel estimation value using the Front-loaded DMRS,
   wherein the Front-loaded DMRS is:
      mapped to a position rearward the control channel in a first slot, and
      mapped based on a rule specified such that the Front-loaded DMRS does not collide with the control channel in a second or subsequent slot, wherein
         the rule specifies that the Front-loaded DMRS is mapped, in a slot having the number of symbols in the control channel more than the first slot, to a position rearward where the Front-loaded DMRS does not collide, and
         the processor identifies a mapping configuration of the Front-loaded DMRS in the second or subsequent slot based on the rule.

2. A terminal, comprising:
   a receiver that receives a downlink signal including scheduling information;
   a processor that:
      demaps the scheduling information from the downlink signal, and
      maps a control channel and a Front-loaded Demodulation Reference Signal (DMRS) to an uplink signal based on the scheduling information; and
   a transmitter configured to transmit the one or more uplink signals with a plurality of slots being bundled,
   wherein the processor:
      maps the Front-loaded DMRS to a position rearward the control channel in a first slot, and
      selects a mapping configuration of the Front-loaded DMRS based on a rule specified such that the Front-loaded DMRS does not collide with the control channel in a second or subsequent slot,
      wherein the rule specifies that the Front-loaded DMRS is mapped, in a slot having the number of symbols in the control channel more than the first slot, to a position rearward where the Front-loaded DMRS does not collide.

3. A communication method, comprising:
   receiving a downlink signal including a control channel and a Front-loaded Demodulation Reference Signal (DMRS) with a plurality of slots being bundled;
   demapping the control channel and the Front-loaded DMRS from the downlink signal; and
   computing a channel estimation value, using the Front-loaded DMRS,
   wherein the Front-loaded DMRS is:
      mapped to a position rearward the control channel in a first slot, and
      mapped based on a rule specified such that the Front-loaded DMRS does not collide with the control channel in a second or subsequent slot, wherein
         the rule specifies that the Front-loaded DMRS is mapped, in a slot having the number of symbols in the control channel more than the first slot, to a position rearward where the Front-loaded DMRS does not collide, and
         a mapping configuration of the Front-loaded DMRS is identified in the second or subsequent slot based on the rule.

4. A communication method, comprising:
   receiving a downlink signal including scheduling information;
   demapping the scheduling information from the downlink signal;
   mapping a control channel and a Front-loaded Demodulation Reference Signal (DMRS) to an uplink signal based on the scheduling information; and
   transmitting the uplink signal with a plurality of slots being bundled,
   wherein the Front-loaded DMRS is mapped to a position rearward the control channel in a first slot,
      wherein a mapping configuration of the Front-loaded DMRS is selected based on a rule specified such that the Front-loaded DMRS does not collide with the control channel in a second or subsequent slot,
      wherein the rule specifies that the Front-loaded DMRS is mapped, in a slot having the number of symbols in the control channel more than the first slot, to a position rearward where the Front-loaded DMRS does not collide.

* * * * *